Jan. 1, 1935.  R. J. NORTON  1,986,406
ELECTRICAL BRAKE TESTER
Filed March 5, 1929
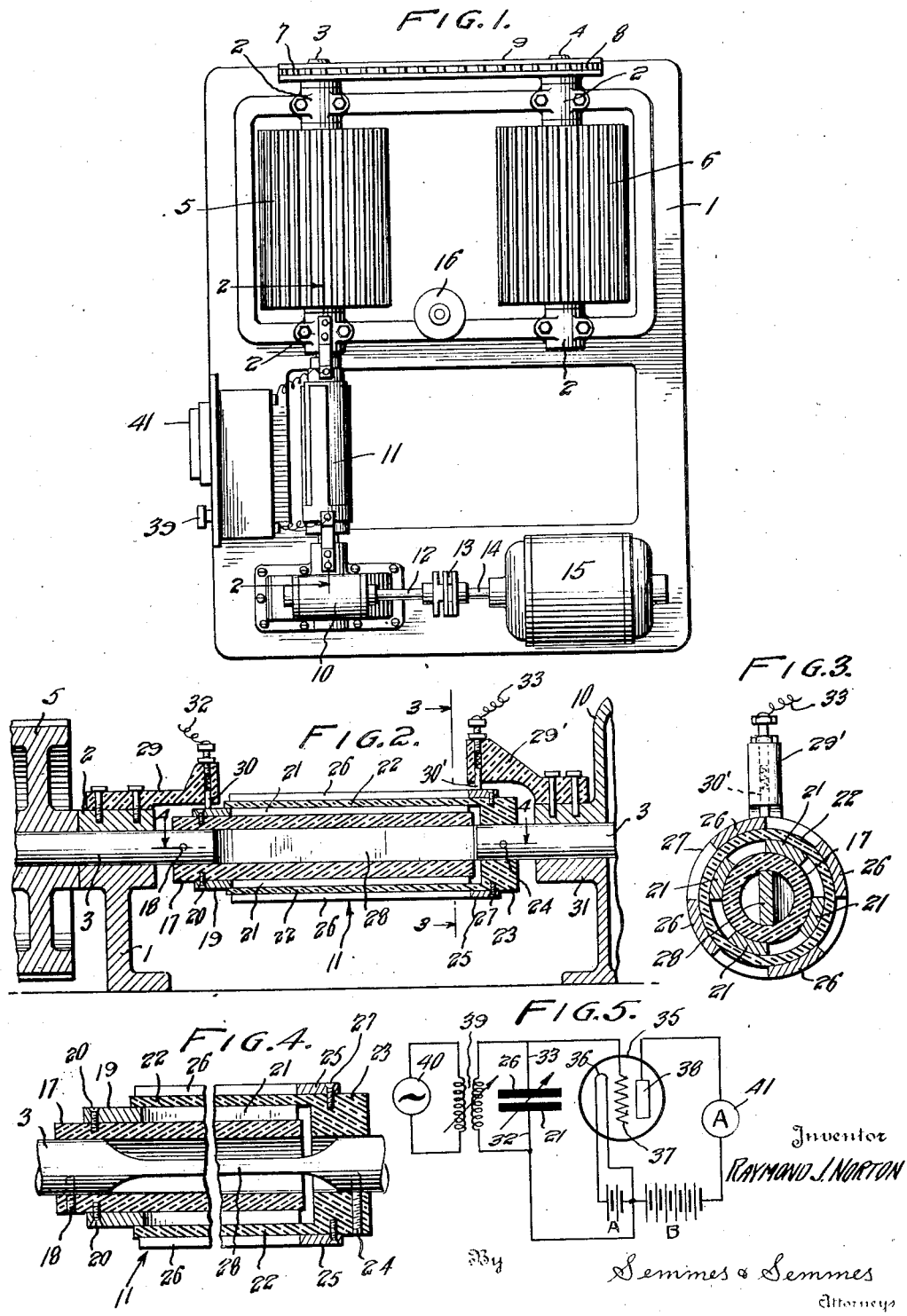

Patented Jan. 1, 1935

1,986,406

UNITED STATES PATENT OFFICE 1,986,406

ELECTRICAL BRAKE TESTER

Raymond J. Norton, Washington, D. C., assignor, by mesne assignments, to Bendix-Cowdrey Brake Tester, Inc., New York, N. Y., a corporation of Delaware Application March 5, 1929, Serial No. 344,572

3 Claims. (Cl. 265—25)

This invention relates in general to brake testing apparatus and more particularly has reference to an apparatus for electrically determining the efficiency of brake mechanisms.

This device generally includes a transmission dynamometer interposed between the source of power and the braking mechanism which serves to measure the reaction force or the torque imposed on the testing assemblage by the application of the brake of a given wheel.

An object of this invention, therefore, is to provide a simple but accurate and sensitive apparatus for determining the retarding force exerted by the braking mechanism of automotive vehicles.

Another object of this invention is to provide an apparatus to measure the resistance of an automotive vehicle brake by measuring a quantity, the value of which is affected by a mechanical effect produced by the application of a brake.

Another object of this invention is to provide a means for electrically testing automotive vehicle brake mechanisms.

Yet another object of this invention is to provide apparatus for testing brakes of automotive vehicles in which the variation in the relative angular displacement of two portions of a shaft for transmitting power to the testing apparatus is used to operate a device for affecting electrical energy in a circuit associated with the testing apparatus.

Still another object of this invention is to provide a means for transmuting a mechanical braking effect into a variation in the characteristics of an electron tube circuit, and indicating the variations as representative of the braking effect.

A still further object of this invention is to provide an apparatus for testing brakes of automotive vehicles, in which the mechanical effect produced by the application of brakes is transmitted to a variable condenser, which is used to vary the frequency of an electrical current flowing through a circuit, and in which variations in frequencies are indicated as retardation effects.

With these and other objects in view, which may be incident to my improvements, the invention consists in the concept of utilizing a mechanical effect of brake application to control electrical energy such as the quantity of electrical current flowing from a source through a circuit, or the frequency of an electric current, and then measuring the effect of the control as hereinafter set forth and claimed, with the understanding that the several necessary features of my invention may be varied without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawing:

Figure 1 is a plan view of a brake testing machine constructed in accordance with my invention.

Figure 2 is a detailed sectional view taken on line 2—2 of Figure 1, showing the mechanism for varying the capacity of a condenser.

Figure 3 is a sectional view taken on line 3—3 of Figure 2.

Figure 4 is another sectional view of the condenser associated with the torsion meter.

Figure 5 is a diagrammatic illustration of an electrical circuit associated with the testing machine.

Brake mechanisms are provided on automotive vehicles primarily to decelerate the speed of the vehicle. In the present practice, brake mechanisms are provided directly on the ground wheels of the vehicle, or on shafts directly connected with all or certain of the ground wheels. The immediate and direct result of the operation of the braking mechanism is a decrease in the angular velocity of the brake-controlled ground wheels. Upon applying a light force to the brake-operating device, the deceleration will be relatively and correspondingly small; however, upon increasing the force applied to the brake-operating device, the deceleration effect of the brake mechanism will be proportionately increased. The preceding is, of course, based on the assumption that possible variables, such as the coefficient of friction between the drum and the braking element, the brake mechanism, etc., be maintained substantially constant.

The present specific embodiment of the invention comprises measuring a quantity which is a derivative of the increase in torque in a transmission shaft driving a given wheel, which itself results from the application of a given retarding force to the wheel. In particular, the present embodiment comprises the measurement of a factor which is a derivative of the speed retardation, and consequently the variation in torque, by controlling the measurable characteristics of an electric current, and indicating the degree of control.

In order to simplify the description of my invention, a device susceptible of carrying the same into effect has been illustrated rather diagrammatically in the accompanying drawing. It will be appreciated, in view of the principles herein involved, that numerous diversifications and modifications in the actual structure will readily suggest themselves to those skilled in the art. As shown in the drawing, the invention may be embodied in a unit comprising a base 1, which may be mounted in any desired position at the end of a ramp, or suitably installed in a pit, or in any other location found advantageous for the purpose of testing brakes. The base 1 is provided with a plurality of bearings 2, which journal shafts 3 and 4, which in turn support corrugated rollers 5 and 6 respectively. The rollers 5 and 6 are surfaced and are so positioned that they may be effectively used for driving a wheel of an automotive vehicle.

One end of the shaft 3 carries a sprocket wheel 7, and the corresponding end of shaft 4 carried a similar sprocket wheel 8. Passing over the sprocket wheels 7 and 8 is a suitable chain 9, which is so positioned and adjusted as to transmit rotary motion from one of the rollers to the other. The other end of shaft 3 projects beyond the bearing 2 and is connected with a speed reduction device 10, which may be of any desired type or speed ratio. Shaft 3 has a torsion meter 11 associated therewith, which will be described in detail hereinafter. The driving shaft 12 of the speed reduction device 10 is connected by a flexible coupling 13 to the shaft 14 of an electric motor 15. The speed reduction device 10 and the motor 15 are preferably mounted on the base 1, together with the other elements of the brake tester.

It will be understood from the foregoing description that upon energizing the motor 15 the shaft 14 will be rotated, and rotary motion will be transmitted through the coupling 13, speed reduction device 10, torsion meter 11 and shaft 3, to roller 5, and by means of the chain drive 7, 9, 8 to roller 6. The drive between rollers 5 and 6 is such that the two rollers rotate in the same direction. Thus, when a vehicle wheel is placed on the rollers, it will be rotated by the action of both rollers. To prevent the wheel running off of rollers 5 and 6 onto the driving machinery, a vertically mounted roller 16 is positioned on a shaft carried by base 1.

From the discussion hereinbefore set forth, it will be understood that the present embodiment contemplates utilizing the variation in the torque imposed on shaft 3, under varying load conditions imposed on the testing machine by the application of brake mechanism, to retard rotation of the wheel, to vary the characteristics of electrical energy in an electrical circuit. This may be practically effected by means of the structure shown in the drawing.

As hereinbefore pointed out, shaft 3 is of sufficient length to project beyond bearing 2 and connect with the driven portion of the speed reduction device 10. It will be appreciated that as a load is applied to the rollers 5 and 6 by the application of a brake to the wheel positioned on the rollers, there will be torque set up in the shaft 3; that is, a point on shaft 3 adjacent the speed reduction device 10 will move to a position angularly in advance of a normally corresponding point on the shaft adjacent bearing 2. This relative angular displacement of portions of shaft 3 is employed to effect relative movement between elements of an electrical energy affecting device associated with shaft 3.

A sleeve 17 formed of a phenolic condensation product or of any other suitable substance is mounted on shaft 3 and is fixed thereto at one end by means of a pin or screw 18. Sleeve 17 is connected with shaft 3 at one end only so as not to affect the twist of this shaft. Attached to sleeve 17 adjacent the end fixed to shaft 3 is a metallic band 19. Any suitable attaching means such as screws 20 may be employed for securing the parts together. A plurality of blades 21 extend axially from band 19 along the outer surface of insulating sleeve 17. These blades or plates form one member of a variable condenser.

Encasing a portion of band 19 and the blades or plates 21 is a sleeve 22, formed of insulating material. This sleeve 22 is provided with a body portion 23 having an internal diameter equal to the diameter of shaft 3. The body portion 23 is fixed to shaft 3 by means of a pin or screw 24. A band 25 provided with plates or blades 26, constructed similarly to band 19 and plates 21, is secured to the body portion 23 by means of screws 27, as is clearly shown in Figures 2 and 4.

From the foregoing description, it will be appreciated that the angular position of the set of plates 21 will correspond to that of the portion of shaft 3 to which sleeve 17 is attached, and the angular position of plates 26 will correspond to that of the portion of shaft 3 to which the body portion 23 of sleeve 22 is attached. Thus for a displacement of one portion of shaft 3 relative to another portion thereof, there will be a change in the relative positions of the plates 21 and 26. This relative movement of the sets of plates effects a variation in the capacity of the condenser formed by the plates.

If found desirable, shaft 3 may be cut down as shown at 28 to permit a greater variation in the relative displacement of the portions of the shaft to which the insulating sleeves 17 and 22 are attached. To protect the condenser and to reduce variation due to centrifugal force produced by rotation of shaft 3, a third insulating sleeve, not shown, may be provided to encase the outer set of plates.

In order to connect the condenser formed by plates 21 and 26 in an electrical circuit, a brush holder 29 is so positioned on bearing 2 as to support a brush 30 in contact with the band or ring 19. Brush holder 29 is provided with a socket in which the brush 30 is slidingly mounted. A portion of the socket is threaded to receive a screw for adjusting the pressure exerted by a spring or brush 30 to force it into engagement with ring 19. A similar structure is associated with the bearing 31 of the speed reduction device 10, similar parts being indicated by similar reference characters, primed. Suitable leads 32 and 33 are associated with brush holders 29 and 29′, by means of which the condenser is connected with an electrical circuit. While I have described a particular type of brush construction, I wish it to be clearly understood that any other type found suitable may be employed.

It will be appreciated that any variation in the relative angular displacement of portions of shaft 3 will cause a corresponding variation in the relative angular position of plates 21 and 26, and consequently a variation in the capacity of the condenser formed by these plates. In the construction shown in the drawing the capacity of the condenser is increased with imposition of an increased load on the rollers 5 and 6, but I wish it to be clearly understood that the plates 21 and 26 may be arranged on the torsion device so that an increase in load will effect a decrease in the capacity of the condenser. The condenser formed by plates 21 and 26 may be placed in an electrical circuit such as is diagrammatically shown in Figure 5. This circuit includes an electron tube 35, having a filament 36, grid 37 and plate 38.

One coil of a manually operated variable inductance 39 is connected in the grid circuit; that is, between the grid 37 and one side of the filament. The variable condenser formed by plates 21 and 26 is also placed in the grid circuit and is shunted across the coil 39. The other coil of the inductance 39 is connected to a source of electrical energy 40, which may be an alternator or oscillator of any suitable design. A galvanometer, milli-ammeter, or other suitable current indicating device 41 is connected in series with a "B" battery in the plate circuit to measure the flow of current through this circuit.

When the alternator is placed in operation, oscillation will be set up in its circuit and in the grid circuit of the electron tube. Upon supplying current to the filament 36 from the "A" battery, there will be a flow of electrons from the filament to the plate, causing a current to flow in the plate circuit. Now, if the grid circuit is tuned by varying the capacity of condenser 21, 26, the e. m. f. across the inductance and condenser will be varied. This will effect a variation in the current flowing in the plate circuit. When the grid circuit is in resonance, the potential will be a maximum and the plate current will be at a maximum, other conditions remaining unchanged. As the reactance of the grid circuit is varied, the current in the plate circuit will be varied. Thus, for a variation in the capacity of condenser 21, 26, there will be a direct variation in the current flowing through the plate circuit.

Since the current flowing through the plate circuit is a function of the reactance of the grid circuit, and the latter is a function of the variation in capacity of condenser 21, 26, and the capacity of this condenser varies directly as the torque tending to angularly displace one portion of shaft 3 relative to another portion thereof, the current indicated on the dial of the current indicating instrument 41 may be used to compute the torque and the brake resistance in terms of other physical quantities.

In the preferred form of the invention the milli-ammeter, or other indicating device, employed is somewhat modified; that is, the dial is calibrated so that the pointer directly indicates brake resistance in terms of retarding torque.

These calibrations may be made, as will be understood, by testing the speed of the testing unit when operating against given varying torques imposed and indicated by a suitable prony brake, or other dynamometer. Since the increase in current indicated by the ammeter 41 is proportionate to the increased resistance exerted by the brake being tested, the transformation and calibration may readily be made. The actual calibration of a given unit will, of course, depend on the particular hook-up employed, the flexibility of shaft 3, the size of condenser 21, 26, the type and size of thermionic tube employed, the value and character of energy generated by the alternator 40, the potential of the "A" and "B" batteries and on the value of inductance in the circuit. The manually operable inductance 39 provides a means for adjusting the reading of the current indicating device 41 to initial conditions.

The condenser 21, 26 may be associated with an alternating current circuit for varying the frequency thereof. In this instance a frequency meter is employed to indicate variations in frequency. Since the variation in frequency depends on the variation in capacity of the condenser, which in turn depends upon the retardation effect of the application of brakes to the element being tested, the frequency meter can be calibrated as in the case of the current indicating device to read directly in terms of brake retardation.

The mode of operation of the tester will have been appreciated from the foregoing description. When the vehicle is in testing position, so that a wheel engages the wheel rotating rollers 5 and 6, the closing of the motor circuit will cause motor 15 to effect rotation of these rollers through the interposed transmission. Upon applying the brakes to the wheel, the driving motor will rotate the wheel against the resistance of the brake but with an increase in the torque in the transmission corresponding to the brake resistance. This increase in torque will cause a fluctuation in the torsion meter 11 located in the transmission shaft 3.

This fluctuation in the portions of shaft 3 will effect a variation in the capacity of the condenser associated therewith. The variation in the capacity of condenser 21, 26 will, as hereinbefore described, affect the energy in the grid circuit of the electron tube to cause a variation in the current in the plate circuit, which is determined by means of a current indicating device. The brake retardation will be indicated directly on the indicating device up to a point where the vehicle wheel slips with respect to the wheel rotating means.

When employed for varying the frequency of a circuit, the brake retardation will indicate directly on the dial of a frequency meter up to a point where the vehicle wheel slips relative to the driving means.

The electrical circuit and instruments have been shown associated with the base 1 of the testing apparatus, but I wish it to be clearly understood that the electrical devices, particularly those affected by vibrations, may be placed in any suitable location remote to the testing apparatus.

I wish it to be clearly understood that in the event indications on the dial of the final indicating meter are not large enough, the final indicating energy can be amplified by any type of amplification system so as to obtain sufficient energy for effecting as large an indication on the dial of the instrument as is desirable.

It will be appreciated that I have provided a very simple and effective apparatus for testing vehicle brakes. The apparatus employed for testing said vehicle brakes involves a very simple electrical circuit, necessitating the use of electrical equipment which is standard and readily available on the market. Also, employment of the several simple electrical elements involved in the testing mechanism obviates the necessity of the use of a complicated mechanical dynamometer. All of the electrical elements involved in the testing device are of a type which may be very readily checked from time to time to determine the accuracy of the testing device.

This invention provides a brake tester in which the wheel rotating means are positively connected to the driving motor without interposing any absorption dynamometer in the transmission.

The present invention also provides an electrical energy affecting device particularly adapted for measuring the relative displacement of portions of a transmission shaft by variations in electrical energy in a circuit with which the device is associated.

While I have shown and described a particular embodiment of the invention, it is to be understood that this is given purely by way of example. As hereinbefore pointed out, the fundamental concept involved in this invention is a utilization of a mechanical effect of brake testing and the transformation of this effect into an electrical effect, which may be used as a means of measuring the efficiency of the brake being tested. I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A dynamometer for a brake tester comprising a drive shaft having a resilient portion adapted to yield in accordance with transmitted torque, a cylindrical condenser segment carried by said drive shaft at one end of the resilient portion, said segment being coaxial with said drive shaft and adjacent said resilient section, a second cylindrical condenser segment of greater radius than the first segment arranged coaxial with said shaft and adjacent said first named segment, said last named segment being secured to and carried by the shaft at the other end of said resilient portion, means for making electrical connections to each of said segments, while rotating, and means for measuring change of capacity between said segments due to relative displacement therebetween and the resultant change of capacity.

2. A dynamometer for a brake tester, comprising a drive shaft having a portion thereof of reduced cross section, an insulating sleeve secured to the shaft at one side of said reduced portion, a cylindrical condenser segment carried thereon, a second sleeve telescoping said first sleeve and secured to the shaft at the other side of said reduced portion, a cylindrical condenser segment carried by said sleeve angularly adjacent said first named segment, means for making electrical connections to each of said segments while rotating and means for measuring angular displacement or change of capacity between said segments due to changes in torque transmitted by said shaft.

3. A dynamometer for a brake tester comprising, a drive shaft having a portion thereof of reduced cross section, an insulating sleeve secured to the shaft at one side of said reduced portion, a cylindrical condenser segment carried thereon, a second sleeve telescoping said first sleeve and secured to the shaft at the other side of said reduced portion, a cylindrical condenser segment carried by said sleeve angularly adjacent said first named segment, means for making electrical connections to each of said condenser segments while rotating, said segments being connected to the grid and cathode of a vacuum tube in shunt with a secondary of a transformer, a source of alternating current connected to the primary of said transformer, and means in the plate circuit of said vacuum tube for indicating changes in the reactance of the grid circuit due to variations of capacity between said segments, whereby the torque transmitted through said shaft may be readily indicated.

RAYMOND J. NORTON.